(12) United States Patent
Pirot et al.

(10) Patent No.: US 6,577,561 B2
(45) Date of Patent: *Jun. 10, 2003

(54) ANTI-CHIPPING RECORDING DISC, READING METHOD AND RECORDING HEAD

(75) Inventors: François-Xavier Pirot, Magny (FR); Jean-Claude Lehureau, Ste Genevieve des Bois (FR)

(73) Assignee: Thomson-CSF, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,255
(22) PCT Filed: Sep. 22, 1998
(86) PCT No.: PCT/FR98/02034
§ 371 (c)(1), (2), (4) Date: May 25, 1999
(87) PCT Pub. No.: WO99/17281
PCT Pub. Date: Apr. 8, 1999

(65) Prior Publication Data
US 2002/0136124 A1 Sep. 26, 2002

(30) Foreign Application Priority Data
Sep. 26, 1997 (FR) .............................. 97 11986

(51) Int. Cl.[7] .............................. G11B 7/085
(52) U.S. Cl. ................ 369/30.1; 369/44.26; 369/53.21; 369/59.25; 369/275.3; 369/275.4
(58) Field of Search .................. 369/111, 121–122, 369/275.1, 275.3–275.4, 277, 278, 279, 30.1, 30.15, 44.26, 53.21, 59.25, 47.54

(56) References Cited

U.S. PATENT DOCUMENTS

| | | | |
|---|---|---|---|
| 4,449,212 A | * | 5/1984 | Reno |
| 4,459,690 A | * | 7/1984 | Corsover et al. |
| 5,477,524 A | * | 12/1995 | Deguchi et al. |
| 5,850,381 A | * | 12/1998 | Miyano |
| 6,201,775 B1 | * | 3/2001 | Nakane et al. |

FOREIGN PATENT DOCUMENTS

| | | |
|---|---|---|
| JP | 08-147767 | 6/1996 |
| JP | 09-81938 | 3/1997 |

OTHER PUBLICATIONS

Patent Abstracts of Japan, vol. 96, No. 4, for JP 8–87777, Apr. 2, 1996.*

* cited by examiner

Primary Examiner—W. R. Young
(74) Attorney, Agent, or Firm—Oblon, Spivak, McClelland, Maier & Neustadt, P.C.

(57) ABSTRACT

An anti-piracy recording disk. The disk includes a main recording track which has interruptions or changes of turn. This gives rise to non-sequential reading and therefore to information which is difficult to access. The copying of such a disk by conventional means is very difficult making it possible to easily detect counterfeits or to render any copy unusable.

45 Claims, 3 Drawing Sheets

Continued below.

ANTI-CHIPPING RECORDING DISC, READING METHOD AND RECORDING HEAD

BACKGROUND OF THE INVENTION

1. Field of the Invention

The invention relates to a anti-piracy recording disk and a process for recording and reading such a disk. The invention is applicable in particular in the field of optical disks and magneto-optical disks.

2. Disussion of the Background

Compact disks of the CD-ROM type and DVDs (Digital Video Disks) are used to disseminate all kinds of information (data, programs). Traditionally, these disks were not susceptible to data piracy since their capacity was greater than that of most storage means on the market. With the appearance on the one hand of high-capacity hard disks, and on the other hand of cheap CD-ROM etchers, this situation is completely altered. The duplicating of data is now within the scope of semi-professionals or even amateurs.

In the various recording media, from the hard disk to the optical disk and to the magnetic tape, the information is grouped into elements generally called blocks. A table of contents allocating the blocks to the various files is recorded somewhere on the same medium. For example, the blocks of a Digital Audio (DA) CD are allocated to each of the recorded pieces of music via this table of contents. Likewise, the blocks of a CD-ROM are each allocated to relevant computer files. Each block number contains a data set, the goal being for the set of data retrieved to perfectly reproduce those which were recorded, the same ones at each access. Error correcting codes reduce the inevitable error rate to an acceptable value for the relevant application.

In a conventional disk, the information is written sequentially on a spiral. The various addresses are arranged in a numerical order. The reading of the information is therefore carried out sequentially. The invention relates to a recording disk in which reading cannot be carried out in a sequential manner.

SUMMARY OF THE INVENTION

The invention provides a solution making it possible to detect a recording which has been copied fraudulently and even to render this recording unusable.

The invention therefore relates to an information recording disk comprising a main recording track recorded in a general manner in the form of a spiral comprising a plurality of segments of almost concentric turns, characterized in that the said main track comprises one or more interruptions and/or changes of turn and in that the addresses of the blocks and/or sectors are not arranged sequentially on the track.

BRIEF DESCRIPTION OF THE DRAWINGS

The various objects and characteristics of the invention will become more clearly apparent in the description which follows and in the appended figures which represent.

DETAILED DESCRIPTION OF THE PREFERRED EMBODIMENTS

In an optical disk, conventionally, the information is written on a spiral-shaped track. The reader follows this spiral so as to recover the information. If it needs data which lies far from the point at which the optical head is located, it moves by a distance specified by the origin position and the table of contents (TOC) and then makes a fine search for the area requested by using the sector number information read. According to the invention, at least one secondary track parallel to the main track, and which is therefore nested with the first, is introduced into at least one area of the disk. Normally, when reading, the reader will be positioned on the main track or on a secondary track in a random manner.

Figure 2A:
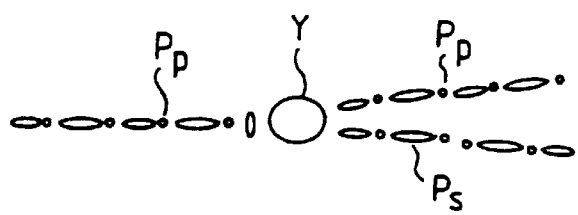
FIGS. 2a to 2e, examples of switchpoints from the main track to the secondary track.
Figure 2B:
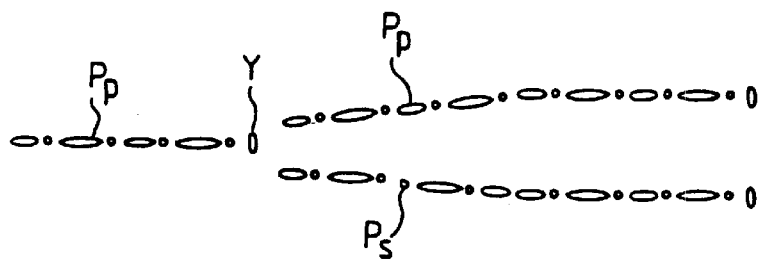
Figure 2C:
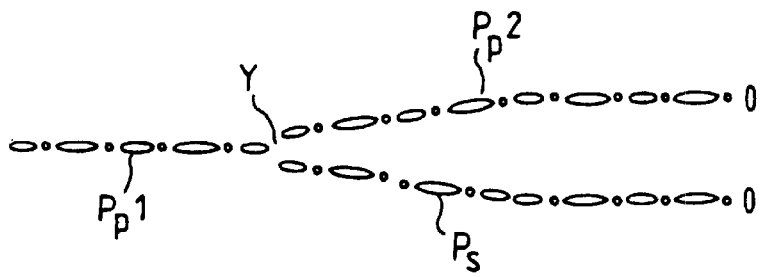

According to FIGS. 2a to 2c, the secondary track Ps can be joined up to the main track Pp by a "Y"-shaped switchpoint. In FIG. 2a, the switchpoint consists of a tracking element Y of large dimension. In FIG. 2b this element Y is wider at the branchpoint. In FIG. 2c, the main track Pp1 is interrupted and continues via the main track Pp2 which is slightly offset from the axis of the track Pp1. The secondary track Ps is symmetric with Pp2 with respect to the axis of Pp1.

Figure 2D:
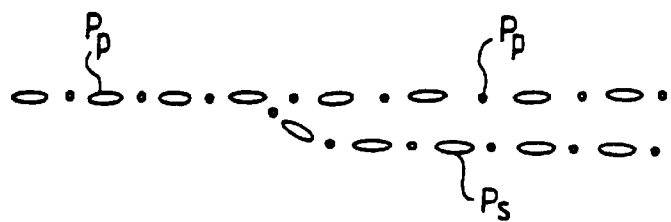

According to FIG. 2d, there is no symmetry between the secondary track and the main track. The main track, for example, has no change of direction and it is the secondary track which joins up with the main track.

The introduction of the random positioning may come from the drawings of a bifurcation at a certain place on the track, the reader choosing one or the other branch while reading depending on the instantaneous state of the tracking signal.

Figure 2E:
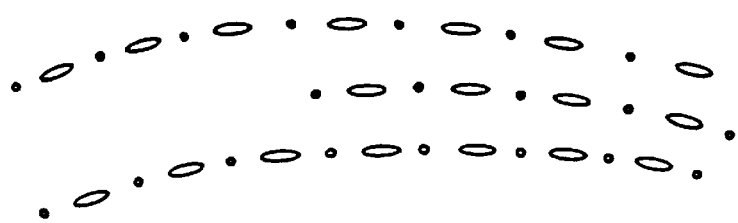

According to FIG. 2e, there is no join between the main track and the secondary track; the latter is simply placed in parallel with the main track.

The reading manager of the reader will be responsible for reading both the secondary track and the main track. This will be explained in greater detail as the description proceeds.

According to the invention, provision is also made to write different data to the secondary track and to the main track. Under these conditions, it will be easy to recognize an original disk and a copied disk.

This is because the act of copying the disk does not make it possible to duplicate both the secondary track and the main track. The copying system takes into account one and only one set of data. Moreover, even if a computer specialist who has understood the device reads the coded sector a great many times so as to obtain access to the two sets of information, he does not have a device capable of reproducing the random behaviour alluded to.

Moreover, not only will it be possible to detect a copy of such a disk, but by providing, on the secondary track, data necessary for the operation of the software of the disk, it is possible to render such a copy unusable.

For the management of such a disk, provision may be made for the secondary track to contain one or more information blocks. The start-of-block address may be equal to a start-of-block address situated on a main track which neighbours it. More precisely, it may be situated substantially on the same radius of the disk.

According to another variant, the secondary track contains blocks whose addresses are not contained on the main track. To read the successive blocks of the disk, therefore, the blocks of the secondary track will have to be read.

By providing one or more secondary tracks nested in the spiral of the main track, the disk of the invention may not be reproduced in full and makes it possible to render "pirate" copies detectable or even to render them unusable.

Figure 5A:
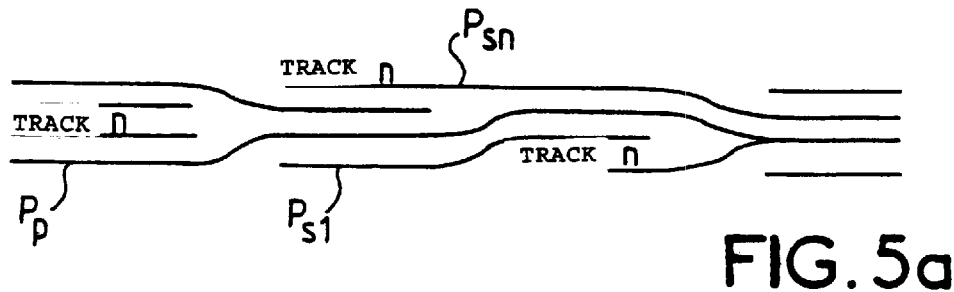
FIGS. 5a, 5b, a variant embodiment according to the invention.

According to another variant, the disk comprises at least one area with a large number of discontinuous or continuous segments of tracks, which may be entwined. An example of this configuration is depicted in FIG. 5a. By way of example, the CD-ROM consists of nearly 300,000 blocks of 2 kbytes. The modified area can comprise a number of bifurcations of the order of magnitude of the number of blocks, that is to say each block can be followed by a continuation (straight on, to the right or to the left) or by an interruption of the groove.

Analysis of this modified area with the aid of an optical reader type device can take a very long time and even be countered by the poor positioning and repetition of the block numbers. For example, the track segments may contain block addresses which are not strictly in the order of their physical position, contrary to the usual rule. Additionally, the field required to trace back to the topography of the sectors on the disk is such that it is almost impossible to access the topography of the disk by optical means.

Only information on the topography of the disk in accordance with the invention makes it possible to access all the segments, and hence all the information.

To manufacture such a disk, two or three beams can write (or not) spiral tracks in parallel. In order to preserve the normal operation of disk readers, the pitch of the two spirals can be increased so as to preserve a spacing equal to that imposed by the standard rules (1.6 µm for CD-ROMs, 0.65 µm for the first generation DVDs).

Figure 4:
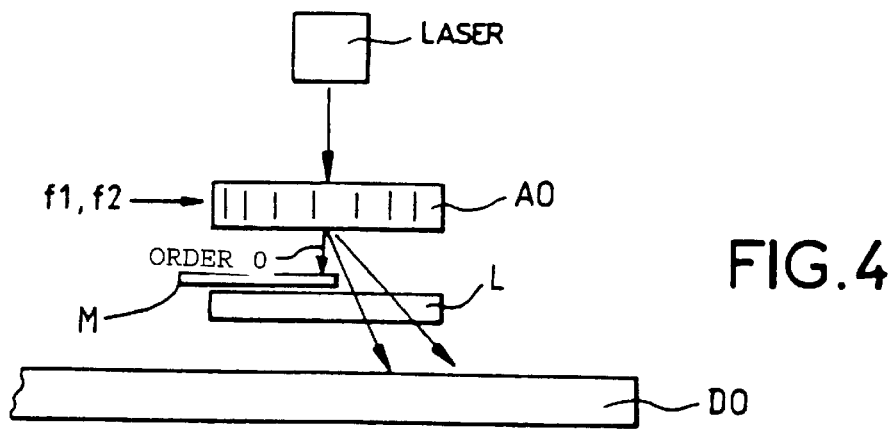
FIG. 4, a reading head device making it possible to write two tracks onto a disk.

The machines used at present to manufacture masters etch just a single groove while the disk is rotating, the beam moving radially synchronously with the rotation. A modification of these machines for manufacturing masters is therefore necessary. On the one hand, the variable pitch of the various spirals necessitates controlling the radial movement of the etching laser with a time-varying speed. On the other hand, an acousto-optical component serving to modulate the beam can be used with two or three frequencies which are different but sufficiently close together to be controlled from a conventional electronic circuit. The separation of the two directions and of the zero order also entails a modification of the focusing optics. FIG. 4 provides, in a simplified manner, such a system in which an acousto-optical transducer AO receiving a laser beam modulates it with two frequencies f1 and f2 or more. Two angularly deviated beams then make it possible to etch two tracks either simultaneously or subsequently so as to make one or two parallel tracks. The undeflected beam (order 0) is blocked by the mask M.

Between the acousto-optical transducer AO is provided a device L which focuses the beams onto the disk. Moreover, this device can comprise means for blocking the transmission of the beam of order transmitted by the acousto-optical device AO.

The reading of such a disk possessing at least one secondary track will now be described.

Figure 1:
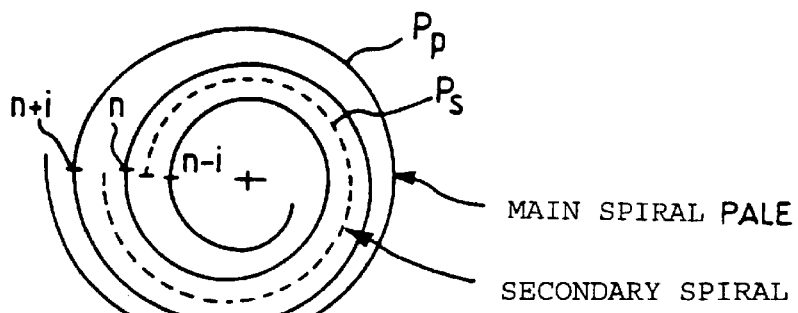
FIG. 1, an example of a recording disk with two spiral recording tracks according to the invention.

Firstly let us consider the case in which the secondary track is nested in the spiral of the main track as is represented in FIG. 1 and that the block numbers (or physical addresses) of this secondary track are different from those of the main track.

If it is assumed that the physical address n is given to a block of the secondary track and to a block of the main track, when the reading system requests that this address n be read, according to the current operation of readers, a fast search is carried out by reading the block numbers and then by a finer search, for example by counting the tracks traversed, followed possibly by corrections until the relevant block n is detected. The fast positioning, and to some extent the slower positioning, is random to within a track. This can be exploited if the double spiral extends far enough around the address n to reach the most probable landing area of the reading system.

However, since an address n is located both on the secondary track and on the main track according to whether during the search the disk reading head moves from the centre of the disk to the periphery or vice versa, it will first find either the address n of the secondary track, or the address n of the main track. The reading system can therefore be programmed in such a way that in the search for types of addresses which exist twice in the disk, two searches are made: one search with a movement of the reading head from the centre of the disk towards the periphery and one search from the periphery of the disk towards the centre. Thus, the two addresses n will necessarily be reached and it will be possible to read the blocks situated at these addresses.

Another method also consists in reading the address n+i of the main track close to the area n, then the address n. Next, reading the address n−i of the main track also close to the area n, then the address n. In this way, if the secondary track is short (less than one revolution of the disk), both addresses n of the secondary track and of the main track will be reached.

The reading of main and secondary tracks possessing a branchpoint such as that represented in FIGS. 2a to 2c will now be described.

Let us assume that at a given point a main track splits into two daughter tracks (a main track and a secondary track). A priori, each particular system will veer either to one side, or to the other repetitively. However, for each system, a particular geometry will induce a random orientation between the branches. A limited number of branchpoint geometries makes it possible to obtain the "random" geometry of most of the systems on the market.

In order to limit the disturbance to the system on passing the branchpoint, it is easy to write the same data in a perfectly synchronous manner on both branches as long as the latter are close together.

If it is decided to intervene in a fine manner in the operation of the reader, it is possible to introduce a slight bias into the tracking actuator with each pass in one direction and in the other successively so as to aid orientation onto one branch or the other.

In any event, an almost certain way of reading the two addresses n situated on the secondary track and on the main track is to read the data situated at these addresses several times, record them and compare them. If it is observed that different data have been read at two addresses n, it may be deduced from this that the secondary track and the main track have been read.

Finally, the case will now be explained of the reading of a secondary track whose addresses or addresses of blocks does not exist on the main track.

Figure 3:
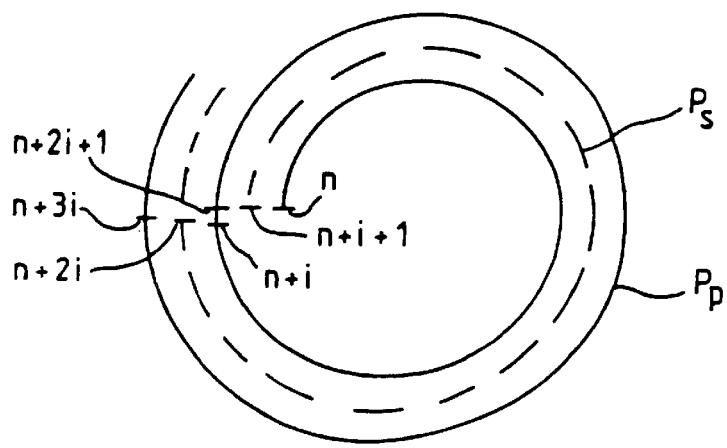
FIG. 3, a example of the addressing of the main and secondary tracks.

This case is represented by FIG. 3.

Let us assume that at least locally a disk supports two nested spirals. The main track carries on one revolution, for example, the contiguous addresses from n to n+i, then on a second revolution from n+2i+1 to n+3i etc. The secondary track carries the addresses from n+i+1 to n+2i in such a way that this section is "sandwiched" between the two relevant sections of the main track. The software examines the behaviour of the reading head when reading the three series of addresses. The track jumps are characteristic of the layout of the blocks; in particular, if a reading of blocks n to n+3i is requested, the fine and/or coarse tracking signal carry the signature of the two jumps required to recover all the blocks.

The disk of the invention makes it possible to introduce a randomness when reading data on a disk recorded in accordance with the invention. For example, any reader on the market, when the program commands it to read the particular sector of the disk coded in accordance with the method proposed, will sometimes read one data set A and sometimes another set B.

However, this CD or DVD disk, copied by conventional, even sophisticated, means will contain a single data set. By attempting a number of accesses to the relevant sector, the program will then be able to determine, if the data reread are always the same, that the disk is a copy; if they are sometimes A and sometimes B, that the disk is an original.

The benefit of this design of disk is that it is compatible with all the existing CD-ROM readers on the market without even needing to modify their software operation (Driver).

Figure 5B:
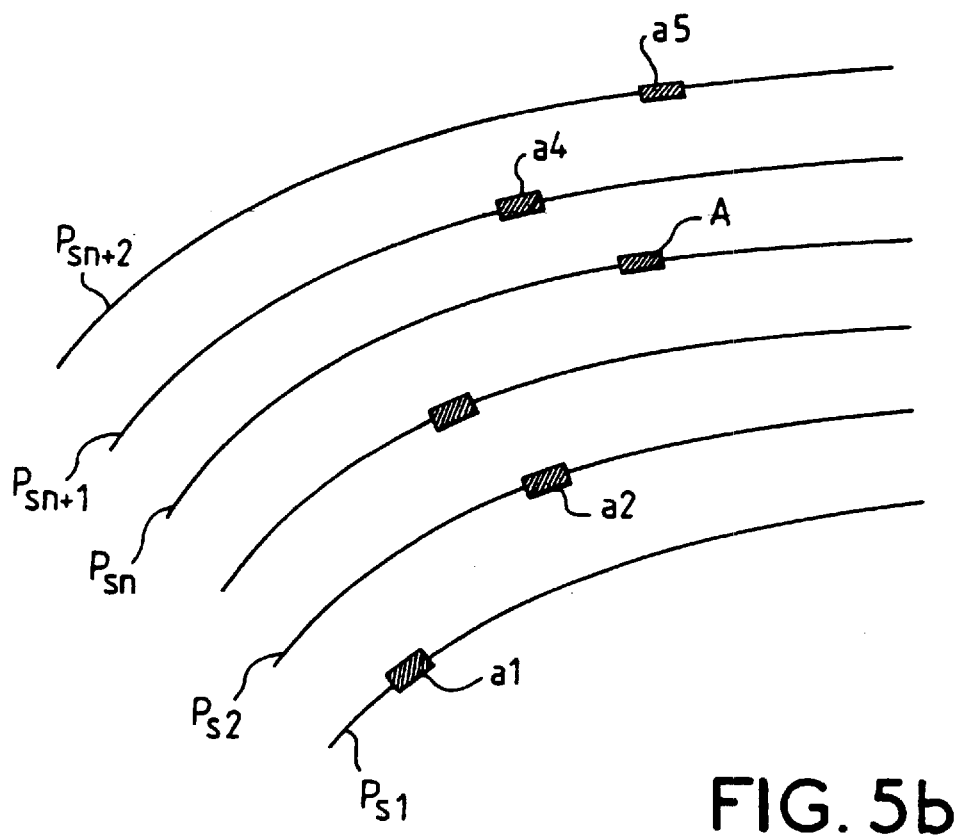

In the alternative embodiment of FIGS. 5a and 5b the track Pp is regarded as being the main track and information is regarded as being written on secondary tracks Ps1, . . . Psn. The track Psn is regarded for example as representing a sector (or a block) and as containing a block with address A such that this sector should be located on the track Ps1. Block A should therefore be regarded as having been moved and as not being in its logical place. The disk's normal reading system will therefore be incapable of retrieving this sector. To alleviate this problem, the invention makes provision in various neighbouring tracks to write information making it possible to find the address A. For example, the track Ps1 contains the address A and associated with this address, an information item a1 indicating that in jump of 3 tracks be made towards the outside of the disk to find the address A; the track Ps2 also contains the address A and an information item a2 indicating that a jump of 2 tracks be made towards the outside of the disk; . . . the track Psn+2 contains the address A and an information item a5 indicating that a jump of 2 tracks be made towards the inside of the disk. Therefore, according to the invention, the information items a1, a2, . . . a5 contain positioning information giving the path to be followed so as to find the segment to be read. This information may be likened to "mechanical" information as opposed to logical information.

In the description of FIG. 5a, the track Pp was regarded as being a main track and the other tracks as secondary tracks. It is also possible to regard all the tracks as being main tracks. In any event, the system is devised in such a way that the tracks contained in a ring encompassing a track containing a block with addresses such as A comprises information for controlling the reading head, such as the above information a1, a2, . . . a5.

We shall describe the operation of such a disk comprising a large number of track segments, in accordance with the invention:

As specified above, it is necessary to obtain information about the topography of the disk in order to access the information. The latter may be present on an area of the disk in order to access the information. The latter may be present on an area of the disk, for example in a coded manner. This information may also be dispersed over the whole of the modified area.

An optical device of the Compact Disk reader type for example uses means for the coarse positioning of the reading head and electromechanical and/or electrooptical means for tracking and for jumping tracks ensure the exact positioning of the reading spot on the track segment to be read.

When searching for information on the disk in accordance with the invention, the pick-up is sent by the coarse operation to an area comprising a large number of track fractions. It is not possible accurately to ascertain the position of the pick-up on the disk; on the other hand, the track segment reread contains user information and also positioning information giving the path (for example the number of track jumps and their direction) for reaching the information carried on one or more track segments located nearby. This information about the path to be followed is specific to the segment reread. Accordingly, a reasonable number of accesses does not make it possible to trace back to a complete map of the disk, the first step towards the illicit copying of the contents.

On the other hand, access to an item of information of interest to the user on the disk in accordance with the innovation is effected in a time substantially equal to the access time in a conventional disk.

This design of disk therefore makes it possible to identify an original disk and a disk copied by a pirate, even equipped with considerable means.

It does not involve any "dongle" type key, nor code, nor interaction between the supplier and the customer.

The reading of such a disk is compatible with the mechanical optical and electrical operation of CD.ROM readers, it may on the other hand be necessary to modify the software operation (driver).

What is claimed is:

1. A disk for optically recording information, comprising:
   a main continuous recording track recorded in a general manner in a form of a spiral comprising a plurality of segments of substantially concentric turns, said information being distributed into blocks identified by respective addresses,
   wherein said disk further comprises at least one secondary track, inserted between successive turns of said main track, in parallel with said main track and also comprises supporting blocks,
   wherein said respective addresses are not arranged sequentially on a single track, and
   wherein a first address identifies a block on the main track and a block on the at least one secondary track.

2. A disk according to claim 1, wherein said main track and said at least one secondary track comprise information situated in a same angular sector of the disk.

3. A disk according to claim 1, wherein, in a same angular sector of said disk, said at least one secondary track as well as neighboring turns of said main track contain information.

4. A disk according to claim 1, wherein said at least one secondary track is shorter than the main track.

5. A disk according to claim 4, wherein said at least one secondary track has a length less than one adjacent revolution of the spiral of the main track.

6. A disk according to claim 1, wherein said at least one secondary track includes different information from the main track.

7. A disk according to claim 1, wherein the address of a start of said at least one secondary track has the same address as a block of the main track.

8. A disk according to any one of claims 1 to 7, wherein the main track is in the form of a spiral having a pitch of whose turns are variable in such a way as to provide a larger pitch in an area intended to contain a secondary track.

9. A disk according to claim 8, wherein said at least one secondary track is linked to the main track by a Y-shaped switchpoint.

10. A disk for optically recording information, comprising:
   a main recording track recorded in a general manner in a form of a spiral comprising a plurality of segments of substantially concentric turns, said information being distributed into blocks identified by respective addresses,
   wherein said main track comprises one or more interruptions and changes of turn giving rise to one or more secondary tracks, inserted between successive turns of said main track, in parallel with said main track and also comprises supporting blocks,
   wherein said respective addresses are not arranged sequentially on a single track, and
   wherein a first address identifies a block on the main track and a block on the at least one secondary track.

11. A disk according to claim 10, wherein said main track and said one or more secondary tracks comprise information situated in a same angular sector of the disk.

12. A disk according to claim 10, wherein, in a same angular sector of said disk, said one or more secondary tracks as well as neighboring turns of said main track contain information.

13. A disk according to any one of claims 11 or 12, wherein specified sectors of the track contain positioning information thereby enabling access to a block moved with respect to a normal place of said block on the disk.

14. A disk according to claim 10, wherein a plurality of segments of turns constituting a ring incorporating a segment of turn in which a block with a specified address is located each contain the said address with which is associated an information item for controlling a disk reading head.

15. A disk according to claim 14, wherein a positioning information item associated with an address of a specified block and contained in a segment of track represents a number of tracks separating the segment of track from the segment of track in which the specified block is localized.

16. A disk according to claim 15, wherein the positioning information item is a track jump information item for instructing a disk reading head to move.

17. A disk according to claim 10, wherein said one or more secondary tracks are each shorter than the main track.

18. A disk according to claim 10, wherein said one or more secondary tracks have each a length less than one adjacent revolution of the spiral of the main track.

19. A process for reading a disk for optically recording information, the disk comprising a main continuous recording track recorded in a general manner in a form of a spiral comprising a plurality of segments of substantially concentric turns, said information being distributed into blocks identified by respective addresses, in which said disk further comprises at least one secondary track, inserted between successive turns of said main track, in parallel with said main track and also supporting blocks, and wherein the addresses of the blocks are not arranged sequentially on a single track, said process comprising the step of searching for an address n existing both on the secondary track and on the main track by effecting a first search by moving a reading head from a center of the disk towards a periphery and a second search by moving the reading head from the periphery towards the center of the disk.

20. A reading process according to claim 19, further comprising the steps of:
   searching for an address (n−i) situated on a turn of the main track situated between the address n and the center of the disk, and searching for the address n; and
   searching for an address (n+i) situated on a turn of the main track situated between the address n and the periphery of the disk, and searching for the address n.

21. A process for reading a disk for optically recording information, the disk comprising a main continuous recording track recorded in a general manner in a form of a spiral comprising a plurality of segments of substantially concentric turns, said information being distributed into blocks identified by respective addresses, in which said disk further comprises at least one secondary track, inserted between successive turns of said main track, in parallel with said main track and also supporting blocks, and wherein the addresses of the blocks are not arranged sequentially on a single track, said process comprising the steps of performing several reads on data situated at addresses n located on the secondary track and on the main track and storing the data read until the reading of different data is detected.

22. A process for reading a disk for optically recording information, the disk comprising a main continuous recording track recorded in a general manner in a form of a spiral comprising a plurality of segments of substantially concentric turns, said information being distributed into blocks identified by respective addresses, in which said disk further comprises at least one secondary track, inserted between successive turns of said main track, parallel with said main track and also supporting blocks, and wherein the addresses of the blocks are not arranged sequentially on a single track, said at least one track being linked to the main track by a Y-shaped switchpoint, said process comprising the steps of causing the reading head to track in such a way as to favor an orientation towards one branch of the switchpoint, and causing the reading head to track in such a way as to favor an orientation towards an other branch of the switchpoint.

23. Information recording disk comprising a main recording track recorded in a general manner in the form of a spiral comprising a plurality of segments of almost concentric turns, wherein said main track comprises at least one of an interruption and change of turn giving rise to one or more secondary tracks and wherein the addresses of blocks or sectors are not arranged sequentially on a single track, wherein said at least one of an interruption and a change of turn gives rise to one or more secondary tracks, wherein the disk further comprises a secondary information track parallel to the main information track, and wherein the secondary track is linked to the main track by a Y-shaped switchpoint.

24. A disk according to claim 23, wherein said main track and said one or more secondary tracks comprise information situated in a same angular sector of the disk.

25. A disk according to claim 23, wherein, in a same angular sector of said disk, said one or more secondary tracks as well as neighboring turns of said main track contain information.

26. A disk according to claim 23, wherein said one or more secondary tracks are shorter than the main track.

27. A disk according to claim 26, wherein said one or more secondary tracks have a length less than one adjacent revolution of the spiral of the main track.

28. A disk according to claim 23, wherein said one or more secondary tracks include different information from the main track.

29. A disk according to claim 28, wherein said one or more secondary tracks include information for operation of a software recorded on said disk.

30. A disk according to claim 23, wherein the address of a start of said one or more secondary tracks has the same address as a block of the main track.

31. A disk according to claim 23, wherein the addresses of data situated on said one or more secondary tracks are different from the addresses of the main track.

32. A disk according to claim 31, wherein the addresses of the data situated on said one or more secondary tracks correspond to unused addresses on the main track.

33. Information recording disk comprising a main recording track recorded in a general manner in the form of a spiral comprising a plurality of segments of almost concentric turns, wherein said main track comprises at least one of an interruption and a change of turn giving rise to one or more secondary tracks and wherein the addresses of blocks or sectors are not arranged sequentially on a single track, wherein the main track and the one or more secondary tracks comprise information situated in a same angular sector of the disk, wherein the disk further comprises a secondary information track parallel to the main information track, and wherein the secondary track is linked to the main track by a Y-shaped switchpoint.

34. A disk according to any one of claims 23 to 33, wherein the main track is in the form of a spiral having a pitch of whose turns are variable in such a way as to provide a larger pitch in an area intended to contain a secondary track.

35. A disk according to claim 33, wherein, in a same angular sector of said disk, said one or more secondary tracks as well as neighboring turns of said main track contain information.

36. A disk according to claim 33, wherein said one or more secondary tracks are shorter than the main track.

37. A disk according to claim 36, wherein said one or more secondary tracks have a length less than one adjacent revolution of the spiral of the main track.

38. A disk according to claim 33, wherein said one or more secondary tracks include different information from the main track.

39. A disk according to claim 38, wherein said one or more secondary tracks include information for operation of a software recorded on said disk.

40. A disk according to claim 33, wherein the address of a start of said one or more secondary tracks has the same address as a block of the main track.

41. A disk according to claim 33, wherein the addresses of data situated on said one or more secondary tracks are different from the addresses of the main track.

42. A disk according to claim 41, wherein the addresses of the data situated said one or more secondary tracks correspond to unused addresses on the main track.

43. A disk according to any one of claims 35–42, wherein the main track is in the form of a spiral having a pitch of whose turns are variable in such a way as to provide a larger pitch in an area intended to contain a secondary track.

44. A disk for optically recording information comprising a main continuous recording track recorded in a general manner in a form of a spiral comprising a plurality of segments of substantially concentric turns, said information being distributed in blocks identified by respective addresses, wherein said disk further comprises at least one secondary track, inserted between successive turns of said main track, in parallel with said main track and also supporting blocks, and wherein the addresses of the blocks are not arranged sequentially on a single track, wherein the main track is in the form of a spiral having a pitch of whose turns are variable in such a way as to provide a larger pitch in an area intended to contain a secondary track, and wherein said at least one secondary track is linked to the main track by a shaped switchpoint.

45. A disk for optically recording information, comprising:

a main continuous recording track recorded in a general manner in a form of a spiral comprising a plurality of segments of substantially concentric turns, said information being distributed into blocks identified by respective addresses, wherein said disk further comprises at least one secondary track, inserted between successive turns of said main track, in parallel with said main track and also supporting blocks, wherein the main track is in a form of a spiral having a pitch with variable turns so as to provide a larger pitch in an area configured to contain a secondary track, and wherein said at least one secondary track is linked to the main track by a Y-shaped switchpoint.

* * * * *